UNITED STATES PATENT OFFICE.

WILLIAM L. BLISS, OF NIAGARA FALLS, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

SEPARATOR FOR STORAGE BATTERIES.

1,206,983.     Specification of Letters Patent.     Patented Dec. 5, 1916.

No Drawing.     Application filed March 27, 1914. Serial No. 827,755.

*To all whom it may concern:*

Be it known that I, WILLIAM L. BLISS, a citizen of the United States, residing at Niagara Falls, in the county of Niagara, in the State of New York, have invented new and useful Improvements in Separators for Storage Batteries, of which the following is a specification.

This invention relates to separators for storage batteries.

Storage batteries which employ positive and negative plates immersed in or subjected to the action of an electrolyte are provided with separators which serve to mechanically separate the adjacent plates and to electrically insulate them from each other but which, at the same time, are sufficiently porous to permit the electrolyte to percolate therethrough. The degree of porosity, however, must be such as will prevent what is known as "treeing" which is the formation of minute metallic bridges between the plates or elements.

An object of the present invention is to provide an improved separator having the requisite mechanical strength and electrical insulating properties, which is capable of resisting the destroying action of the electrolyte.

Another object of the invention is to provide an improved process of manufacturing a battery separator.

A composition which will provide a separator having the desired mechanical and electrical characteristics is formed of asbestos or mineral wool incorporated with one of the phenol condensation products such as bakelite or condensite. The asbestos and binder are mixed in the desired proportions together with a finely divided material which is readily soluble in acids, alkaline solutions or other re-agents. Finely divided zinc or zinc compounds which are readily attacked by acids or finely divided pumice stone which is soluble in dilute acids are suitable for this purpose. The ingredients in the proper proportions form a plastic batch which is molded into the desired shape and size and then subjected to heat and pressure to harden the mass. The separator is then subjected to the action of acids or other re-agents to dissolve out the soluble zinc or pumice stone. The elimination of the soluble substance leaves a finely porous structure of acid-proof material through which the battery liquids may readily percolate but whose fineness of porosity is such that the phenomenon of metal "treeing" is practically impossible. Separators formed of this composition containing phenolic condensation products as a base have many advantages over those composed of other molded materials. They possess the requisite mechanical strength and high insulating properties and also they are not affected by temperature changes, that is, they may become heated to a high degree due to the internal heat of the battery or other causes without losing their characteristics. They will not soften or change shape or configuration due to overheating.

Separators of any desired shape may be formed. Thus, they may be in the form of thin, smooth sheets or of sheets ribbed or corrugated on one or both sides of the surfaces may be indented or otherwise prepared. The separators may be made in sizes ready for use or may be made in large sheets which are thereafter cut up to desired sizes and otherwise shaped for use.

What I claim as new and desire to secure by Letters Patent is

1. A storage battery separator the body of which contains a phenolic condensation product.

2. A storage battery separator formed of a finely divided mass of acid resisting material incorporated with bakelite as a binder.

3. A composition for the manufacture of storage battery separators formed of finely divided, acid-resisting material incorporated with one of the phenol condensation products as a binder.

4. A composition for the manufacture of storage battery separators formed of asbestos fibers incorporated with one of the phenol condensation products as a binder.

5. The process of forming a storage battery separator which includes mixing an acid resisting material and a finely divided soluble material with a phenolic condensation product as a binder, molding and hardening the mass under the combined action of heat and pressure, and treating the hardened separator to dissolve the soluble material.

6. The process of forming a storage battery separator which includes mixing asbestos and a finely divided soluble material with bakelite and hardening the composition under the combined action of heat and pressure, and treating the hardened separator to dissolve the soluble material whereby a storage battery separator is formed possessing mechanical strength and insulating properties and which will not soften or change its formation under the action of heat.

7. The process of forming a composition for the manufacture of battery separators which includes mixing an acid-resisting material and a finely divided soluble material with a binder capable of hardening under the action of pressure, molding and hardening the mass under pressure and treating the molded article to dissolve the soluble material.

WILLIAM L. BLISS.

Witnesses:
R. H. VAN NEST,
C. S. LANE.